(12) United States Patent
Constans et al.

(10) Patent No.: US 12,539,920 B2
(45) Date of Patent: Feb. 3, 2026

(54) COWL VENT GRILLE WITH A FLOW BLOCK

(71) Applicant: PSA AUTOMOBILES SA, Poissy (FR)

(72) Inventors: Jean-Luc Constans, St. Maur des Fosses (FR); Jean Francois Ollie, Louveciennes (FR)

(73) Assignee: Stellantis Auto SAS, Poissy (FR)

( * ) Notice: Subject to any disclaimer, the term of this patent is extended or adjusted under 35 U.S.C. 154(b) by 434 days.

(21) Appl. No.: 18/548,463

(22) PCT Filed: Mar. 2, 2022

(86) PCT No.: PCT/FR2022/050375
§ 371 (c)(1),
(2) Date: Aug. 30, 2023

(87) PCT Pub. No.: WO2022/214743
PCT Pub. Date: Oct. 13, 2022

(65) Prior Publication Data
US 2024/0132157 A1   Apr. 25, 2024
US 2024/0227942 A9   Jul. 11, 2024

(30) Foreign Application Priority Data

Apr. 8, 2021 (FR) ..................................... 2103583

(51) Int. Cl.
*B62D 25/08* (2006.01)
(52) U.S. Cl.
CPC ................................. *B62D 25/081* (2013.01)
(58) Field of Classification Search
CPC ..................................................... B62D 25/081
See application file for complete search history.

(56) References Cited

U.S. PATENT DOCUMENTS

| 3,120,797 | A  | * | 2/1964 | Beyer ...................... | B60H 1/28 |
| | | | | | 180/69.2 |
| 2019/0106078 | A1 | * | 4/2019 | Nakamura ........... | B62D 29/005 |
| 2022/0315124 | A1 | * | 10/2022 | Mogi ................... | B62D 25/081 |

FOREIGN PATENT DOCUMENTS

| EP | 1457395 A2 | 9/2004 |
| EP | 2439130 B1 | 12/2013 |

(Continued)

OTHER PUBLICATIONS

International Search Report to PCT/FR2022/050375 mailed May 13, 2022.
Written Opinion to PCT/FR2022/050375 mailed May 13, 2022.

*Primary Examiner* — Lori Lyjak
(74) *Attorney, Agent, or Firm* — Sandberg Phoenix & von Gontard, PC

(57) ABSTRACT

A cowl vent grille (10) including a first wall (11), a second wall (12) not aligned with the first wall (11) and offset with respect to said first wall (11), including an air inlet grille (14), a connecting wall (13) connecting an edge of the first wall (11) to an edge of the second wall (12), the first wall (11) extending on one side of the connecting wall (13) and the second wall (12) extending on the opposite side of said connecting wall (13) with respect to the first wall (11). The cowl vent grille (10) includes a low wall (15) extending along the edge located at the junction between the connecting wall (13) and the second wall (12), at least opposite the air inlet grille (14), so as to block the flow of a liquid from the first wall (11) towards the second wall (12).

9 Claims, 2 Drawing Sheets

(56) References Cited

FOREIGN PATENT DOCUMENTS

| EP | 3470308 A1 | * | 4/2019 | ........... B62D 29/005 |
|----|------------|---|--------|-------------------------|
| FR | 2900122 A1 |   | 10/2007 | |
| FR | 2969075 B1 |   | 12/2012 | |
| JP | 2013023177 A | * | 2/2013 | |

* cited by examiner

[Fig.1]
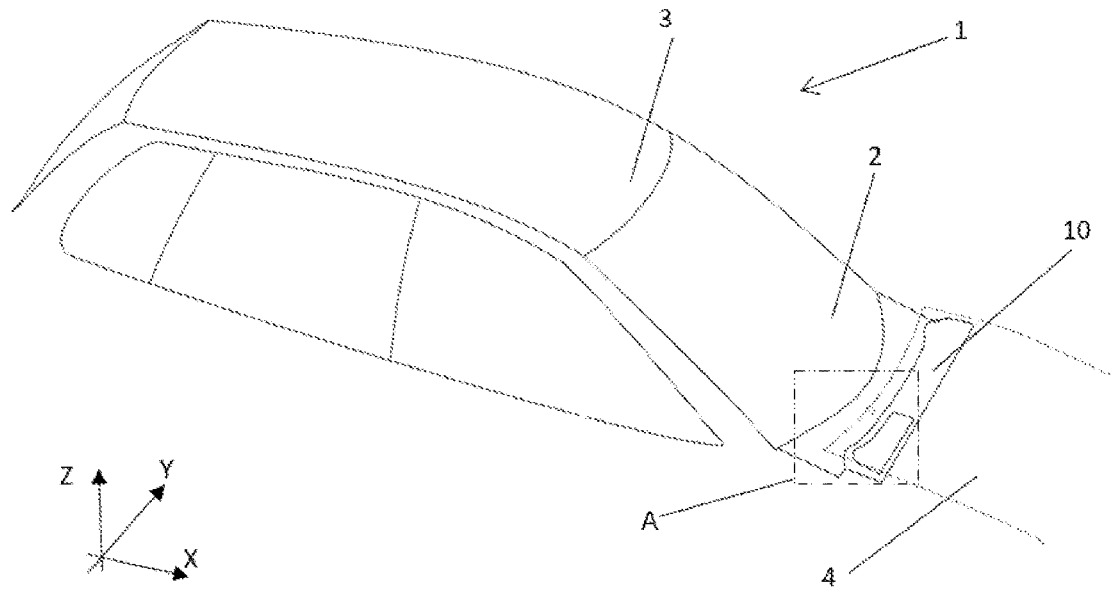
[Fig.2]
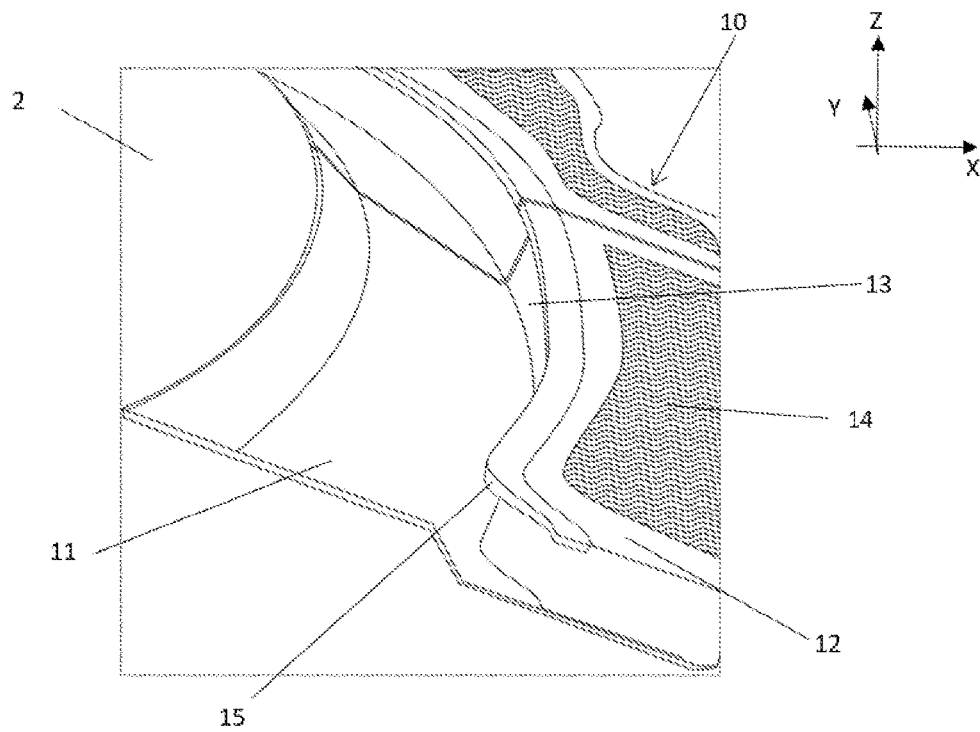

[Fig.3]
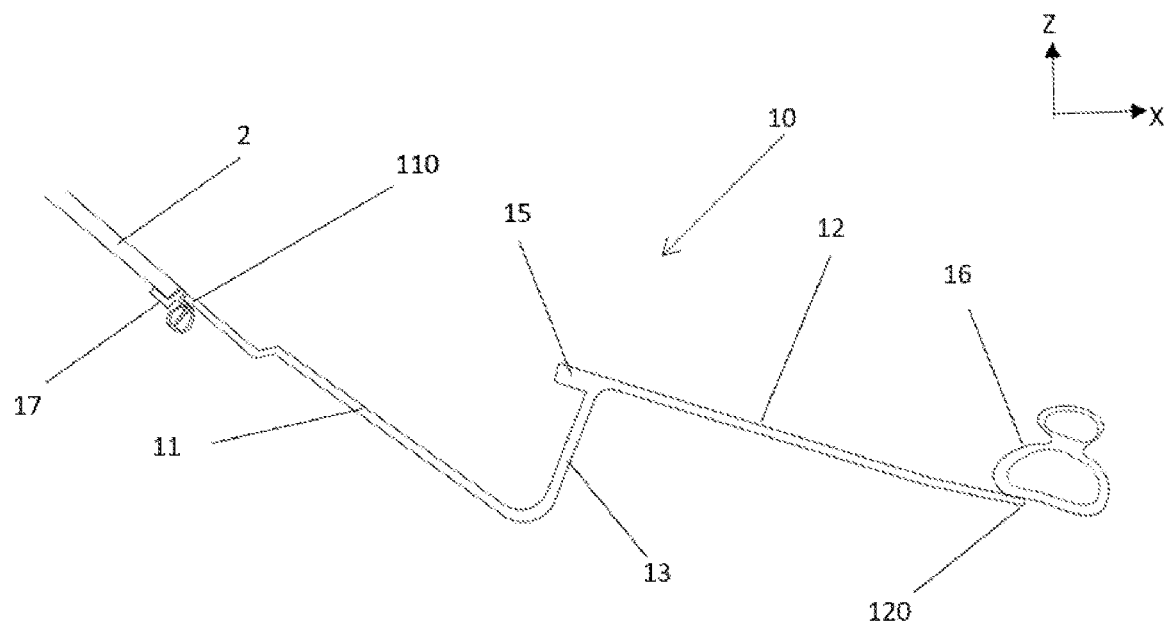

COWL VENT GRILLE WITH A FLOW BLOCK

CROSS-REFERENCE TO RELATED APPLICATIONS

This application is the US National Stage under 35 USC § 371 of International Application No. PCT/FR2022/050375, filed Mar. 2, 2022, which claims the priority of French application 2103583 filed on Apr. 8, 2021, the content (text, drawings and claims) of both said applications being incorporated by reference herein.

BACKGROUND

The devices described herein relate to a cowl vent grille mounted transversely at the bottom of a vehicle windshield, and including an air inlet grille. They also relate to a vehicle including such a cowl vent grille.

It is known to place a cowl vent grille on a vehicle, mounted between a windshield and a front hood, extending transversely to the vehicle. The cowl vent grille generally covers a cowl vent, in which an air inlet is installed for the air conditioning and ventilation system of the passenger compartment of the vehicle. The cowl vent grille further includes an air inlet grille enabling the passage of air towards the inside of the cowl vent so as to enable a supply of fresh air to the air conditioning and ventilation system of the passenger compartment of the vehicle, while retaining dirt, such as dead leaves or pine needles, to prevent them from falling into the cowl vent.

For example, the patent FR2969075 describes a vehicle with such a cowl vent grille. The cowl vent grille comprises a first wall, a second wall not aligned with the first wall and offset with respect to said first wall, and a connecting wall connecting an edge of the first wall to an edge of the second wall. The first wall extends with respect to the connecting wall on the side opposite to the second wall. In other words, a step is present between the first wall and the second wall. The second wall includes an air inlet grille. The first wall is arranged along the bottom of the windshield, aligned with it. The second wall is located offset towards the top of the vehicle with respect to the first wall. When the front hood of the vehicle is in the closed position, it covers at least the portion of the second wall including the cowl vent grille.

The drawback of such a solution is that in the event of rain, in particular heavy rain, the flow of rainwater along the windshield, a portion of which comes from the flow of the water from the roof of the vehicle, brings a large amount of water travelling at speed against the connecting wall, and causes the water to spill over the connecting wall and flow over the second wall. In this case, water will infiltrate the cowl vent by the air inlet grille. Yet, if too much water enters the cowl vent, there is a risk of infiltration of water into the ventilation system. In addition, electrical equipment may be present in the glare shield, such as for example the windshield wiper motor with the drive mechanism, which should preferably be protected from water. Furthermore, water can then stagnate in the cowl vent, generating unpleasant odors sent to the passenger compartment when starting up the air conditioning and ventilation system.

SUMMARY

The objective is to overcome these drawbacks. In particular, one of the aims is to provide a cowl vent grille which reduces the risks of water infiltration into a cowl vent by the cowl vent grille resulting from the flow of the water on the surface of the windshield.

This aim is achieved thanks to a cowl vent grille intended to extend at the bottom of a vehicle windshield, transversely to said vehicle, including a first wall, a second wall not aligned with the first wall and offset with respect to said first wall, said second wall including an air inlet grille, the cowl vent grille further including a connecting wall connecting an edge of the first wall to an edge of the second wall, the first wall extending on one side of the connecting wall and the second wall extending on the opposite side of said connecting wall with respect to the first wall. The cowl vent grille stands out in that it includes a low wall extending along the edge located at the junction between the connecting wall and the second wall, at least opposite the air inlet grille, so as to block the flow of a liquid from the first wall towards the second wall.

Thus, when the cowl vent grille is installed on a vehicle with the first wall in the extension of the windshield of said vehicle, at the bottom of said windshield, the water flowing over said windshield will descend along the first wall, possibly raised along the connecting wall under the effect of its speed, and be blocked by the low wall, preventing this water from flowing over the second wall. Even under heavy rain for example, the risks of water entering through the air inlet grille are reduced. The second wall is offset with respect to the first wall, i.e. it is offset in a direction substantially normal to the first wall.

In a preferred embodiment, the low wall forms a channel with the first wall and the connecting wall. Advantageously, this channel shape makes it possible to effectively block the flow of the water and thus to prevent it from coming over the second wall.

In another embodiment, the low wall extends in the alignment of the second wall or parallel to the first wall, on the side of the connecting wall in which the first wall extends.

Thus, advantageously, the water rising under the effect of its speed along the connecting wall is returned back in a direction opposite to the second wall, in a particularly effective manner which reduces the risks of flow over the second wall.

In another embodiment, the low wall extends over the entire junction edge between the second wall and the connecting wall.

Thus, advantageously, the entire second wall is protected from the flow of water coming from the windshield, and air inlet grilles may be installed at several locations or along the second wall.

In another embodiment, the low wall is a rib. Thus, advantageously, the low wall takes up little space and may be made with a minimum of material. In addition, this rib can participate in the stiffening of the cowl vent grille.

In another embodiment, the low wall, the connecting wall, the first wall and the second wall are made integrally in one piece. Thus, advantageously, the cowl vent grille is made simply, without the need for mounting between the different walls and with the low wall.

In another embodiment, the cowl vent grille includes a seal fastened on the second wall, along a front edge opposite to the junction edge between the second wall and the connecting wall, extending on the side of the second wall opposite to that in which the connecting wall extends.

Thus, advantageously, the seal makes it possible to seal between the cowl vent grille and an engine compartment hood opposite the second wall, so as to prevent hot air from the engine compartment under the hood from being sucked in by the air inlet grille.

The devices described herein also relate to a vehicle including a windshield and a cowl vent located at the bottom of the windshield, and comprising a cowl vent grille as described above, covering at least part of the cowl vent, the junction edge of which between the first wall and the connecting wall is arranged lower than the junction edge between the second wall and the connecting wall along the vertical axis of the vehicle.

In a preferred embodiment relating to the vehicle, the cowl vent grille extends transversely over the width of the windshield.

In another embodiment relating to the vehicle, the first wall includes a rear edge opposite to the junction edge between the first wall and the connecting wall, running along the edge of the windshield located along the cowl vent.

BRIEF DESCRIPTION OF THE FIGURES

The described devices will be better understood upon reading the following description, given solely as example, and made with reference to the appended drawings, wherein:

FIG. 1 is a perspective view of the upper portion of a vehicle with a roof, a windshield and a cowl vent grille.

FIG. 2 shows a perspective view of a portion of the cowl vent grille along the area A defined in FIG. 1.

FIG. 3 shows a sectional view along the plane XZ of the vehicle of the cowl vent of FIGS. 1 and 2.

The drawings are schematic representations to facilitate understanding. The components are not necessarily shown to scale. The same references correspond to the same components from one figure to another. The axis X represents the longitudinal direction of the vehicle, the axis Y the transverse direction and the axis Z the vertical direction. The front, rear, top, bottom directions are considered in the reference frame of the vehicle.

DETAILED DESCRIPTION

FIG. 1 shows the upper portion of a vehicle 1, with a roof 3, a windshield 2, a hood 4 illustrated in dashed lines and in a closed position, and a cowl vent grille 10. The cowl vent grille 10 extends over a cowl vent (not shown), transversely to the vehicle. The cowl vent is a volume located at the bottom of the windshield, including an air inlet for the air-conditioning system and including a windshield wiper mechanism (not shown). The cover 4 includes a rear edge, located on the side of the windshield, positioned above the cowl vent grille 10 when said hood 4 is in the closed position. The cowl vent grille 10 extends in the lower portion of the windshield 2, along the lower edge of the windshield 2, i.e. along the edge of the windshield 2 located on the side of the cowl vent. In order to enable a view of the assembly of the cowl vent grille 10, the hood 4 is illustrated so as to be transparent.

As illustrated in FIG. 2, the cowl vent grille 10 includes a first wall 11, a second wall 12 not aligned with the first wall 11 and offset with respect to said first wall 11 and a connecting wall 13 connecting an edge of the first wall 11 to an edge of the second wall 12. The second wall 12 includes an air inlet grille 14. The first wall 11 extends on one side of the connecting wall 13 and the second wall 12 extends on the opposite side of said connecting wall 13 with respect to the first wall 11. That means that a step is formed between the first wall 11 and the second wall 12. The junction edge between the first wall 11 and the connecting wall 13 is arranged lower than the junction edge between the second wall 12 and the connecting wall 13, along the vertical axis Z of the vehicle 1. The cowl vent grille 10 extends transversely, for example over the entire width of the windshield 2.

The cowl vent grille 10 includes a low wall 15 extending along the edge located at the junction between the connecting wall 13 and the second wall 12, at least opposite the air inlet grille 14. This wall makes it possible to block the flow of a liquid from the first wall 11 towards the second wall 12, the flow being derived from the flow of a liquid, such as rainwater, from the windshield 2 over the first wall 11.

As illustrated in FIG. 3, the low wall 15 forms a channel with the first wall 11 and the connecting wall 13. In other words, the low wall 15 extends on the side of the connecting wall 13 in which the first wall 11 also extends. Hence, the walls of the channel are formed by a portion of the first wall 11, the connecting wall 13 and the low wall 15.

In the embodiment of FIGS. 2 and 3, the low wall 15 extends in the alignment of the second wall 12, on the side of the connecting wall 13 in which the first wall 11 extends. For example, it is formed by a rib.

In one variant, the low wall 15 extends for example all along the junction edge between the second wall 12 and the connecting wall 13. In another variant, the low wall 15 extends only at the level of the air inlet grille 14, i.e. along the junction edge between the second wall 12 and the connecting wall located opposite said air inlet grille 14.

In another variant, the low wall 15 may extend parallel to the first wall 11, or be in a direction different from that of the first wall 11 and the second wall 12, extending on the side of the first wall 11. In another variant, the low wall 15 may extend in the alignment of the connecting wall 13.

In the embodiment of FIGS. 3 and 4, the low wall 15, the connecting wall 13, the first wall 11 and the second wall 12 are made integrally in one piece. The assembly of the cowl vent grille 10 may be made in one piece, made of plastic or composite, or alternatively into two parts along the largest dimension of the cowl vent, in other words along the direction Y transverse to the vehicle 1, each portion then including a first wall 11, a second wall 12, a connecting wall 13 and a low wall 14 made in one piece. Alternatively, each portion may be made by several parts assembled together. For example, the low wall 15 may be a portion separated from the rest of the cowl vent grille 10, fastened by gluing, screwing or welding to the rest of the cowl vent grille 10.

As illustrated in FIG. 3, the cowl vent grille 10 includes a seal 16 fastened on the second wall 12, along a front edge 120 opposite to the junction edge between the second wall 12 and the connecting wall 13, extending from the side of the second wall 12 opposite to that in which the connecting wall 13 extends. This front edge 120 of the second wall 12 is located under the hood 4, the hood 4 bearing on said seal 16 when it is in the closed position.

The first wall 11 includes a rear edge 110 opposite to the junction edge between the first wall 11 and the connecting wall 13, and which runs along the lower edge of the windshield 2. As illustrated in FIG. 3, a seal 17 is located along the lower edge of the windshield 2, and includes a rim on which the rear edge 110 of the first wall 11 bears. Fastening means between this rear edge 110 and this seal 17 can be provided to ensure a holding of the cowl vent grille 10 along this windshield lower edge 2.

The invention claimed is:

1. A cowl vent grille intended to extend at the bottom of a vehicle windshield, transversely to said vehicle, including:

a first wall, a second wall not aligned with the first wall and offset with respect to said first wall, including an air inlet grid, a connecting wall connecting an edge of the first wall to an edge of the second wall, the first wall extending on one side of the connecting wall and the second wall extending on the opposite side of said connecting wall with respect to the first wall, a seal fastened on the second wall, along a front edge opposite to the junction edge between the second wall and the connecting wall, extending on the side of the second wall opposite to that in which the connecting wall extends, wherein the cowl vent grille includes a low wall extending along the edge located at the junction between the connecting wall and the second wall, at least opposite the air inlet grille, so as to block the flow of a liquid from the first wall towards the second wall.

2. The cowl vent grille according to claim 1, wherein the low wall forms a channel with the first wall and the connecting wall.

3. The cowl vent grille according to claim 1, whose low wall extends in the alignment of the second wall or parallel to the first wall, on the side of the connecting wall in which the first wall extends.

4. The cowl vent grille according to claim 1, wherein the low wall extends all along the junction edge between the second wall and the connecting wall.

5. The cowl vent grille according to claim 1, whose low wall is a rib.

6. The cowl vent grille according to claim 1, wherein the low wall, the connecting wall, the first wall and the second wall are made integrally in one piece.

7. A vehicle including a windshield and a cowl vent located at the bottom of the windshield, and comprising a cowl vent grille covering at least partially the cowl vent, the junction edge between the first wall and the connecting wall being arranged lower than the junction edge between the second wall and the connecting wall along a vertical axis of the vehicle, said cowl vent grille comprising:

a first wall, a second wall not aligned with the first wall and offset with respect to said first wall, including an air inlet grid, a connecting wall connecting an edge of the first wall to an edge of the second wall, the first wall extending on one side of the connecting wall and the second wall extending on the opposite side of said connecting wall with respect to the first wall, wherein the cowl vent grille includes a low wall extending along the edge located at the junction between the connecting wall and the second wall, at least opposite the air inlet grille, so as to block the flow of a liquid from the first wall towards the second wall.

8. The vehicle according to claim 7, wherein the cowl vent grille extends transversely over the width of the windshield.

9. The vehicle according to claim 8, wherein the first wall includes a rear edge opposite to the junction edge between the first wall and the connecting wall, running along the edge of the windshield located along the cowl vent.

\* \* \* \* \*